United States Patent [19]

Prasad

[11] Patent Number: 5,118,350

[45] Date of Patent: Jun. 2, 1992

[54] DYE-SET FOR IMPROVED COLOR QUALITY FOR INK-JET PRINTERS

[75] Inventor: Keshava A. Prasad, Escondido, Calif.

[73] Assignee: Hewlett-Packard Company, Palo Alto, Calif.

[21] Appl. No.: 737,945

[22] Filed: Jul. 29, 1991

[51] Int. Cl.⁵ .............................................. C09D 11/02
[52] U.S. Cl. ........................................ 106/22; 106/20
[58] Field of Search .................................. 106/20, 22

[56] References Cited

U.S. PATENT DOCUMENTS

| | | | |
|---|---|---|---|
| 4,425,162 | 1/1984 | Sugiyama et al. | 106/22 |
| 4,500,355 | 2/1985 | Shimada et al. | 106/22 |
| 4,818,285 | 4/1989 | Causley et al. | 106/22 |
| 5,017,227 | 5/1991 | Koike et al. | 106/20 |

*Primary Examiner*—William R. Dixon, Jr.
*Assistant Examiner*—Helene Klemanski

[57] ABSTRACT

A set of dyes is provided for use in vehicles employing about 5 to 11% of glycols and/or glycol ethers and the balance water. The dye-set comprises about 2 to 3% of hydrolyzed-Reactive Red 180, about 0.3 to 1% Acid Red 52, with the ratio of hydrolyzed-RR180:AR52 ranging from about 2:1 to 5:1, about 1.75 to 2.75% of Acid Yellow 23, and about 1.75 to 2.5% of Acid Blue 9. The particular dye-set provides bright, saturated colors for ink-jet application for not only special coated paper, but also "plain" office papers and transparencies.

11 Claims, No Drawings

DYE-SET FOR IMPROVED COLOR QUALITY FOR INK-JET PRINTERS

TECHNICAL FIELD

The present invention relates to ink-jet printing, and, in particular, to a specific dye set suitable for use with plain and coated papers and transparencies.

BACKGROUND ART

In the field of color printing, it is desirable to achieve as large of a color gamut as possible without sacrificing necessary ink performance parameters. It is also desirable to achieve secondary colors from the primaries which the consumer readily associates with a name such as blue or red. When the color ink is used in a digital printing device, that is, one in which a dot of color is either present or absent, the ability of the primaries to give recognizable secondaries is even more important. In printing processes such as lithography, dye transfer, and some types of thermal transfer, it is possible to vary spot size so that less is demanded of the primary colored inks when producing a good secondary.

If such an ink is to be used in an ink-jet printing device, characteristics such as crusting, long term stability, and materials compatibility must also be addressed. If the ink is to be used in a thermal ink-jet printer, the further constraint of being thermally stable (kogation-resistant) is added.

In general, a successful ink set for color ink-jet printing must have the following properties: good crusting resistance, good stability, the proper viscosity, the proper surface tension, recognizable secondaries, high color saturation, little color-to-color bleed, rapid dry-time, no negative reaction with the vehicle, be highly soluble in the vehicle, consumer-safe, and low strike-through. While formation of colors on plain papers is required, it is also necessary that the ink set be useful on other print media as well, such as on transparency media. When placed into a thermal ink-jet system, the ink set must also be kogation-resistant.

Some of the conditions may be met by vehicle design; other conditions must be met by the proper selection and combination of the dyes.

While it is fairly simple and obvious to make one ink which will satisfy the above conditions, it becomes very difficult to produce a set of inks to be used together to give three acceptable primaries and which will satisfy these conditions. Indeed, the color and overall appearance of hard copy output are critical to its ultimate acceptability and, thus, saleability in the marketplace.

DISCLOSURE OF INVENTION

In accordance with the invention, a set of dyes is provided that satisfies the criteria given above when used in a vehicle employing about 5 to 11% glycols and/or glycol ethers and the balance water. The dye set comprises about 2 to 3% of hydrolyzed-Reactive Red 180, about 0.3 to 1% Acid Red 52, with the ratio of hydrolyzed-RR180:AR52 ranging from about 2:1 to 5:1, about 1.75 to 2.75% of Acid Yellow 23, and about 1.75 to 2.5% of Acid Blue 9.

The advantages of this dye set include brighter and truer primary and secondary colors on all types of print media and it is compatible on film with higher chroma yellow (Acid Yellow 23).

BEST MODES FOR CARRYING OUT THE INVENTION

The ink set of the invention comprises a set of dyes in a vehicle containing about 5 to 11% glycols and/or glycol ethers and the balance water. The following dyes are employed: (1) about 2 to 3 wt. % of hydrolyzed-Reactive Red 180, about 0.3 to 1 wt. % of Acid Red 52, with the ratio of hydrolyzed-RR180:AR52 ranging from about 2:1 to 5:1; (2) about 1.75 to 2.75 wt. % of Acid Yellow 23; and (3) about 1.75 to 2.5 wt. % Acid Blue 9.

All concentrations herein are in weight percent, unless otherwise indicated. The purity of all components is that employed in normal commercial practice for thermal ink-jet inks. The dyes are purified in accordance with the teachings of U.S. Pat. No. 4,685,968, which employs a reverse osmosis process. With some dyes (specifically, Acid Yellow 23), a conventional ion exchange process is required after purification.

The inks may also include one or more biocides, fungicides, and/or slimicides, as is commonly practiced in the art. Microbial reagents include, but are not limited to, NUOSEPT (Nuodex, Inc., a division of Huls Americal), UCARCIDE (Union Carbide), VANCIDE (RT Vanderbilt Co.), and PROXEL (ICI Americas). About 0.1 to 0.4 wt. % of the microbial agent is employed.

Further, about 0.1 to 1 wt. % of one or more surfactants may be added to the ink. Examples include silicones, such as SILWET L-77 and SILWET L-707 (available from Union Carbide), AEROSOL OT (available from American Cyanamid), and acetylenic polyethylene oxides, such as SURFYNOL 465, available from Air Products & Chemicals. The surfactant provides better bleed characteristics and lower drop volume to reduce paper cockle.

The magenta dye is a mixture of Reactive Red 180 and Acid Red 52. Specifically, the Reactive Red 180 dye as received requires hydrolysis with a stoichiometric amount of sodium hydroxide (NaOH) to stabilize the pH (which tends to drift downward with time). The hydrolyzed form is referred to herein as hydrolyzed-RR180, or h-RR180.

Hydrolyzed-Reactive Red 180 is preferably present in an amount of about 2.25 wt. %, while the concentration of Acid Red 52 is preferably about 0.6 wt. %. The ratio of hydrolyzed-Reactive Red 180 to Acid Red 52 is preferably about 4:1. This particular concentration of magenta dyes renders the best compromise with respect to achieving a chromatic and truer hue of blue without sacrificing the hue and chroma of red below the range of acceptability.

It is not possible to use other magenta dyes, such as Acid Red 52 and/or Direct Red 227, in place of hydrolyzedReactive Red 180 for several reasons:

1. When printing red color on transparency film, Acid Red 52 dye reacts with Acid Yellow 23, causing disappearance of yellow dye, thus, shifting hue. The hydrolyzed-Reactive Red 180 dye reduces the rate of reaction between the two dyes.
2. The red hue with Acid Red 52 alone with Acid Yellow 23 on plain paper and transparency film is less chromatic (lower chroma). A blend of hydrolyzed-Reactive Red 180 with Acid Red 52 has been found to provide brighter reds.

3. The use of Direct Yellow 86 in place of Acid Yellow 23 renders lower chroma yellow and red on both plain and special paper.

4. The Direct Red 227 magenta dye is unsuitable with respect to poor decap (crusting at the nozzles of the pen) at the higher concentrations required with vehicles that contain low surface tension/higher wetting amphiphilic additives. Inks containing these vehicles provide higher dot gain (faster lateral spreading), thus, require smaller drop volume to render the desired drop size. Therefore, to achieve similar saturation, a higher dye load of Direct Red 227 is required.

Acid Yellow 23 by itself is a very high chroma yellow. The parameters of an ink made with this dye are quite satisfactory. Preferably, the concentration of Acid Yellow 23 is about 2 wt %.

Acid Blue 9 has been found to be a good cyan dye having high chroma and good hue. Its use alone is adequate for the cyan dye in the dye set of the invention. Preferably, the concentration of Acid Blue 9 is about 2 wt %.

These dyes include counter-ions for charge balance. In the as-received form, these dyes have sodium counter-ions. However, in some instances, it may be desirable to replace some or all of the counter-ions on the dye with another counter-ion, such as tetramethyl ammonium (as described in U.S. Pat. No. 4,761,180), lithium (as described in U.S. Pat. No. 4,994,110), or another appropriate ion.

In the case of the present invention, the sodium (Na) form of Acid Blue 9 may be employed. Similarly, the sodium forms of hydrolyzed-Reactive Red 180 and Acid Red 52 are used. For Acid Yellow 23, the tetramethyl ammonium (TMA) form is preferably used, in order to reduce crusting.

In setting the concentrations of the dyes in the various inks, it is desired that the inks provide the following results:

| Dye | nm$_{max}$ | Abs ($\pm 0.005$) |
|---|---|---|
| AY23-TMA | 428 | 0.026 |
| AB9-Na | 630 | 0.248 |
| AR52-Na | 566 | 0.209 |
| H-RR180-Na | 540 | 0.152 |

The vehicle of the ink contains the following components:
about 5 to 11 wt. % of at least one glycol and/or glycol ether,
about 0.1 to 0.4 wt. % of a biocide,
about 0.1 to 1 wt. % of at least one surfactant, and
the balance water.

Preferably, the glycol is selected from the group consisting of diethylene glycol and dipropylene glycol, while the glycol ether is selected from the group consisting of 2-(2-butoxyethoxy)ethanol and triethylene glycol butyl ether.

Most preferably, the vehicle comprises about 8 wt % of 2-(2-butoxyethoxy)ethanol, along with about 0.3 wt. % of the biocide, the balance being water.

An added feature of the ink-set of the invention is that it may be used with printers that have a heating means to dry the ink, as well as with printers that have no such heating means. In either event, the resulting colors, both primary and secondary, are bright and true.

INDUSTRIAL APPLICABILITY

The specific dye set disclosed herein is expected to find commercial use in ink-jet printers

EXAMPLES

Inks having the following compositions were prepared, in which the vehicle comprised the following composition:
8 wt. % 2-(2-butoxyethoxy)ethanol,
0.3 wt. % NUOSEPT 95,
0.2 wt. % SILWET L-77, and
the balance water.

The yellow inks contained 2% Acid Yellow 23 dye. The magenta inks contained a mixture of hydrolyzed-Reactive Red 180 (2.25%) and Acid Red 52 (0.6%) dyes. The cyan inks contained 2% Acid Blue 9 dye. Direct Yellow 86 dye was used for comparison.

Print samples produced using inks employing the different dyes and dye blends were measured in the L*a*b* colorspace from print samples. For comparative purposes, $\Delta E^*$ is obtained by taking the square root of the sum of the squares of the differences of two samples. The L*a*b* coordinates for the primary and secondary colors obtained using the various magentas are summarized in Table I below. The data were measured on a Minolta chromameter, D65 Illuminant, full density print samples on Gilbert bond paper. In considering hue changes, one looks primarily at the a* and b* coordinates; as a general rule, a shift of 2 units is easily visible.

TABLE I

| Dye | L*a*b* Coordinates. | | |
|---|---|---|---|
| | L* | a* | b* |
| A: CYAN | | | |
| AB9 | | | |
| Primary Cyan | 57.33 | −13.6 | −44.5 |
| Secondary Blue | 32.98 | 20.6 | −35.2 |
| (Cyan + Magenta: AB9 + AR52 + h-RR180) | | | |
| B: YELLOW | | | |
| AY23 | | | |
| Primary Yellow | 92.38 | −10.8 | 86.8 |
| DY86 | | | |
| Primary Yellow | 84.5 | 1.32 | 50.5 |
| C: MAGENTA | | | |
| AR52 | | | |
| Primary Magenta | 53.02 | 64.3 | −39.0 |
| Secondary Red | 51.07 | 47.1 | 21.5 |
| (Magenta + Yellow: AR52 + DY86) | | | |
| Secondary Blue | 35.43 | 32.91 | −59.5 |
| (Magenta + Cyan: AR52 + AB9) | | | |
| h-RR180 | | | |
| Primary Magenta | 51.80 | 52.9 | 3.95 |
| Secondary Red | 50.34 | 52.7 | 31.22 |
| (Magenta + Yellow: h-RR180 + AY23) | | | |
| Secondary Blue | 31.27 | 16.98 | −25.03 |
| (Magenta + Cyan: h-RR180 + AB9) | | | |
| h-RR180 + AR52 | | | |
| Primary Magenta | 51.65 | 56.1 | −8.85 |
| Secondary Red | 50.15 | 47.8 | 27.8 |
| (Magenta + Yellow: h-RR180 + AR52 + AY23) | | | |
| Secondary Blue | 32.9 | 20.6 | −35.2 |
| (Magenta + Cyan: h-RR180 + AR52 + AB9) | | | |

It is apparent from the L*a*b* values that AY23 is a more chromatic yellow. From the forgoing data, it is clear that the mixture of magentas provides the best combination of secondary red and secondary blue, compared with either magenta alone.

Thus, there has been disclosed an ink-set for use in ink-jet printers. It will be readily apparent to those skilled in this art that various changes and modifications of an obvious nature may be made without departing from the spirit of the invention, and all such changes and modifications are considered to fall within the scope of this invention, as defined by the appended claims.

What is claimed is:

1. An ink-jet ink-set comprising magenta ink, yellow ink, and cyan ink for use with ink-jet printers, each ink comprising a vehicle and at least one dye:
   (a) said vehicle containing about 5 to 11 wt % of at least one member selected from the group consisting of glycols and glycol ethers and the balance water;
   (b) said magenta ink consisting essentially of about 2 to 3 wt % of hydrolyzed-Reactive Red 180 dye and about 0.3 to 1 wt % of Acid Red 52 dye;
   (c) said yellow ink consisting essentially of about 1.75 to 2.75 wt % of Acid Yellow 23 dye; and
   (d) said cyan ink consisting essentially of about 1.75 to 2.5 wt % of Acid Blue 9 dye.

2. The ink-set of claim 1 wherein said mixture of hydrolyzed-Reactive Red 180 and Acid Red 52 dyes ranges in ratio from about 2:1 to 5:1 of hydrolyzed-RR180:AR52.

3. The ink-set of claim 2 wherein said ratio is about 4:1 and the concentration of said hydrolyzed-Reactive Red 180 dye is about 2.2 wt % and the concentration of said Acid Red 52 dye is about 0.6 wt %.

4. The ink-set of claim 1 wherein the concentration of said Acid Yellow dye is about 2 wt %.

5. The ink-set of claim 1 wherein the concentration of said Acid Blue 9 dye is about 2 wt %.

6. The ink-set of claim 1 further including about 0.1 to 1 wt % of a surfactant and about 0.1 to 0.4 wt % of a biocide.

7. The ink-set of claim 6 wherein said glycol is selected from the group consisting of diethylene glycol and dipropylene glycol and said glycol ether is selected from the group consisting of 2-(2-butoxyethoxy)ethanol and triethylene glycol butyl ether.

8. The ink-set of claim 7 wherein said vehicle consists essentially of about 8 wt % of 2-(2-butoxyethoxy)ethanol, about 0.3 wt % of said biocide, and the balance water.

9. An improved ink-jet dye-set for ink-jet printing including (a) a mixture of hydrolyzed-Reactive Red 180 and Acid Red 52 dyes and (b) Acid Yellow 23 dye.

10. The dye-set of claim 9 wherein said mixture of hydrolyzed-Reactive Red 180 and Acid Red 52 dyes ranges in a ratio from about 2:1 to 5:1 of hydrolyzed-RR180:AR52.

11. The dye-set of claim 10 wherein said ratio is about 4:1.

* * * * *